US012611954B2

(12) United States Patent
Sandgren et al.

(10) Patent No.: US 12,611,954 B2
(45) Date of Patent: Apr. 28, 2026

(54) MONITORING CIRCUIT FOR MONITORING OF A PROTECTIVE EARTH CONNECTION IN A VEHICLE CHARGING INTERFACE OF A VEHICLE

(71) Applicant: VOLVO TRUCK CORPORATION, Gothenburg (SE)

(72) Inventors: Victor Sandgren, Gothenburg (SE); Jingxu Gu, Kungälv (SE); Mikaela Öhman, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 761 days.

(21) Appl. No.: 18/050,652

(22) Filed: Oct. 28, 2022

(65) Prior Publication Data

US 2023/0139046 A1 May 4, 2023

(30) Foreign Application Priority Data

Oct. 28, 2021 (EP) .................................... 21205216

(51) Int. Cl.
*B60L 53/62* (2019.01)
*B60L 53/18* (2019.01)
(52) U.S. Cl.
CPC .............. *B60L 53/62* (2019.02); *B60L 53/18* (2019.02); *B60L 2270/20* (2013.01)
(58) Field of Classification Search
CPC ....... B60L 53/62; B60L 53/18; B60L 2270/20
USPC ........................................................ 320/109
See application file for complete search history.

(56) References Cited

U.S. PATENT DOCUMENTS

| | | | | | |
|---|---|---|---|---|---|
| 2011/0216453 | A1* | 9/2011 | Haines | ..................... | H02H 9/00 |
| | | | | | 361/49 |
| 2018/0001776 | A1* | 1/2018 | Kim | ......................... | B60L 53/14 |
| 2019/0131803 | A1* | 5/2019 | Cong | .................. | H02J 7/00712 |
| 2019/0184849 | A1 | 6/2019 | Lim | | |
| 2020/0079233 | A1 | 3/2020 | Kim | | |

FOREIGN PATENT DOCUMENTS

| | | | | | |
|---|---|---|---|---|---|
| CN | 105870553 | B | * | 4/2019 | .............. H01P 1/203 |
| CN | 115179791 | A | * | 10/2022 | .............. B60L 53/60 |
| CN | 116039379 | A | * | 5/2023 | ................ B60L 3/04 |
| EP | 3564059 | A1 | * | 11/2019 | .............. B60L 53/11 |
| KR | 20170094869 | A | | 8/2017 | |

(Continued)

OTHER PUBLICATIONS

Extended European Search Report in corresponding European Application No. 21205216.1 dated Mar. 30, 2022 (9 pages).

*Primary Examiner* — Suresh Memula
(74) *Attorney, Agent, or Firm* — Jeffri A. Kaminski; Venable LLP

(57) ABSTRACT

A monitoring circuit for monitoring of a PE connection in a vehicle charging interface of a vehicle. The vehicle is at least partly electrically powered. The monitoring circuit is connected to a first line of a communication circuit. The monitoring circuit and the communication circuit are separate circuits. The monitoring circuit comprises a current source, a current measuring unit and the PE connection. The current source is adapted to generate a current running through the monitoring circuit. The current measuring unit is adapted to measure the current running through the monitoring circuit and thereby monitoring the PE connection.

8 Claims, 4 Drawing Sheets

(56)             References Cited

FOREIGN PATENT DOCUMENTS

| | | | | | |
|---|---|---|---|---|---|
| KR | 20180092093 | A | | 8/2018 | |
| KR | 20200092624 | A | | 8/2020 | |
| KR | 20250025267 | A | * | 2/2025 | ............ B60L 53/305 |
| KR | 20250085323 | A | * | 6/2025 | ............ G01R 15/04 |
| KR | 20250085395 | A | * | 6/2025 | ............ G01R 31/36 |
| WO | WO-2024227589 | A1 | * | 11/2024 | ............ B60L 53/62 |
| WO | WO-2025029041 | A1 | * | 2/2025 | ............ B60L 53/305 |

* cited by examiner

200

MONITORING CIRCUIT FOR MONITORING OF A PROTECTIVE EARTH CONNECTION IN A VEHICLE CHARGING INTERFACE OF A VEHICLE

TECHNICAL FIELD

The present disclosure relates generally to a monitoring circuit, a vehicle charging interface and an at least partly electrically powered vehicle. More particularly the present disclosure relates to monitoring of a Protective Earth (PE) connection in a vehicle charging interface of a vehicle.

The invention can be applied in at least partly electrical heavy-duty vehicles, such as trucks, buses and construction equipment etc. Although the invention will be described with respect to a fully electrified truck, the invention is not restricted to this particular vehicle, but may also be used in other vehicles such as buses, trailers, wheel loaders, articulated haulers, excavators, backhoe loaders, passenger cars, marine vessels etc. It may also be applied in electrical systems of e.g. electrically operated vessels and in various industrial construction machines or working machines. It is applicable in fully electrically operated vehicles as well as in hybrid vehicles, comprising also a combustion engine.

The terms vehicle and electric vehicle will be used interchangeably herein for the sake of simplicity when referring to a fully electrically powered vehicle and a hybrid vehicle.

BACKGROUND

The Combined Charging System (CCS) is a standard related to charging of electrical vehicles. The CCS standard describes a communication circuit, also referred to as a communication line or Control Pilot, located between the Electric Vehicle (EV) and the Supply Equipment Communication Controller (SECC) of the charging station. A charging inlet is located between the EV and the SECC at a suitable location on the communication circuit. The communication circuit may be described as a communication line for signalling charging level between the vehicle and the charging station, it may be used by the vehicle to initiate charging and for transmission of other information between the vehicle and the charging station.

The charging station may be referred to as Electric Vehicle Supply Equipment (EVSE). The EVSE may be described as a unit that provides electrical power for charging the electrical vehicle, and the SECC may be described as a control unit for the charging station. The SECC at the charging station communicates with the EV Communication Controller (EVCC) at the vehicle. Together, the SECC and the EVCC are responsible for control of the communication between the charging station and the vehicle The Power Spectral Density (PSD) from the EVCC in the communication circuit, i.e, at the charging inlet of the charging station, must be kept within specified limits. PSD is a measure of a signal's power content versus frequency. In addition, the CCS standard states that the integrity of a PE connection between the vehicle and the EVSE must be monitored. To keep the PSD within the standardized limits it is necessary to do calibration of the EVCC for every variation of vehicle wire harness, e.g. length, routing layout, etc., and this will incur an increased development cost since the number of installations in various vehicle applications is large.

FIG. 1 illustrates a known solution for implementing the PE monitor function in an electric vehicle. The left part of FIG. 1 represents the vehicle side and the right part represents the charging station side, and the sides are separated by the inlet 101. The inlet 101, also referred to as charging inlet, comprises an an inlet interface adapted to receive a connector, e.g. a charging cable. FIG. 1 further illustrates the EVCC 105 at the vehicle and the SECC 108 at the charging station. There is a PE ground 110 at the charging station and a PE connection 113 at the vehicle. The PE connection 113 may be referred to as chassis ground or EV grounding point. The PE connection 113 is a PE connection to the chassis of the vehicle. The lines between the EVCC 105 and the SECC 108 represent a communication circuit, and the arrows following the lines represent communication signals going from the EVCC 105, to the SECC 108 and back go the EVCC 105. In the known solution illustrated in FIG. 1, the communication circuit return is routed through the PE connection point 113 on the vehicle chassis. This way, the communication will stop, and charging will not be possible if the PE connection 113 to the chassis is not good. The communication circuit return is illustrated in FIG. 1 with the arrows going in the direction from the SECC 108, via the inlet 101, the PE connection 101 and to the EVCC 105.

As seen from FIG. 1, the current communication circuit serves dual purposes: communication and PE monitoring. The communication path, illustrated with the arrows in FIG. 1 depends on the PE connection 113. Changes to the PE connection 113 or signal wires in the communication circuit necessitate calibration of the EVCC transmit power.

The downside of the known PE monitoring implementation illustrated in FIG. 1 is that the choice of PE grounding point 110 will affect the PSD at the inlet 101 due to e.g. length of cables in the communication circuit. Any changes to the PE ground 110 or the communication circuit wiring in general might thus prompt a calibration of the EVCC 105 to keep the PSD within the bounds specified in the CCS standard.

Therefore, there is a need to at least mitigate or solve this issue.

SUMMARY

An objective of embodiments herein is therefore to obviate at least one of the above disadvantages and to provide improved monitoring of the PE connection.

According to a first aspect of the invention, the objective is achieved by a monitoring circuit for monitoring of a PE connection in a vehicle charging interface of a vehicle according to claim 1. The vehicle is at least partly electrically powered. The monitoring circuit is connected to a first line of a communication circuit. The monitoring circuit and the communication circuit are separate circuits. The monitoring circuit comprises a current source, a current measuring unit and the PE connection. The current source is adapted to generate a current running through the monitoring circuit, and the current measuring unit is adapted to measure the current running through the monitoring circuit and thereby monitoring the PE connection. By the provision of a monitoring circuit which is separate and removed from the communication circuit, an advantage of that the same communication circuit can be used for all vehicle installations. Another advantage is that the separation of the monitoring circuit from the communication circuit makes the communication signals in the communication circuit independent of the PE connection such that a failure or error in the PE connection point will not affect the communication between the EVCC and the SECC. Consequently, it is possible to keep the PSD level at the inlet uniform for all vehicle installations. The monitoring of the PE connection is thereby improved. Note that even if it is possible to maintain the communication, the charging process must be stopped if the monitoring detects a problem with the PE connection.

According to one embodiment, the monitoring circuit may comprise a first branch, and the first branch comprises the current source connected in series with the current measuring unit. An advantage of this is that any suitable current source and current measuring unit may be utilized. Units that are easy to get hold of and to install may be used, and the only requirement is that they are adapted to provide current and to measure the current, respectively. Any suitable standard components with these characteristics may be used. This way, the selection of units that can be used is large, which provides flexibility.

According to a further embodiment, the monitoring circuit may comprise a second branch connected in parallel with the first branch, and the second branch may comprise a choke. An advantage of a choke in the second branch may be that it makes it difficult for communication signals traveling in the communication circuit to travel in the monitoring circuit. Thus, only the current from the current source travels through the monitoring circuit. The choke provides additional isolation between the monitoring circuit and the communication circuit.

According to another embodiment, the first branch and the second branch each have a first end and a second end. Both the first branch and the second branch are connected to the communication circuit at the first ends and to the PE connection at the second ends. This configuration of the monitoring circuit provides an advantage of being a simple and cost-effective configuration which. In addition, it enables the separation between the monitoring circuit and the communication circuit.

According to a second aspect of the invention, the objective is achieved by a vehicle charging interface according to claim 5. The vehicle charging interface comprises:

A charging inlet adapted to receive a charging cable.

A communication circuit located between the charging inlet and an EVCC. The communication circuit is adapted for communication between the EVCC and a SECC.

The monitoring circuit according to any of claims 1-4.

The communication circuit may comprise the whole line from the EVCC via the inlet to the SECC. Advantages and effects of the vehicle charging interface are largely analogous to the advantages and effects of the first aspect. Further, all embodiments of the vehicle charging interface are applicable to and combinable with all embodiments of the monitoring circuit, and vice versa.

According to one embodiment, the communication circuit may be independent of the PE connection. An advantage of this may be that communication signals running can continue to run through the communication even in the event that there is a failure in the PE connection. Consequently, the PSD does not depend on the PE connection. The charging needs to be stopped if a problem with the PE connection is detected. However, it is possible to continue to send communication signals through the communication circuit even if the charging is stopped. Another advantage is that the same communication circuit can be used regardless of the vehicle installation, i.e. there is no need for any tailored communication circuit to each vehicle installation.

According to another embodiment, the charging inlet may comprise the EVCC, or the charging inlet and the EVCC may be separate units. An advantage of the charging inlet comprising the EVCC, i.e. that the EVCC may be integrated into the charging inlet, may be that the communication signal path is short and well-defined. This may reduce the cost and risk for communication link failure and communication signal failure. An advantage of that the charging inlet and the EVCC are separate units may be that they may be easily replaceable in case of any of them malfunctions and easy to install.

According to a third aspect of the invention, the objective is achieved by at least partly electrically powered vehicle according to claim 8. The vehicle comprises the monitoring circuit according to any of claims 1-4. Advantages and effects of the vehicle are largely analogous to the advantages and effects of the first aspect. Further, all embodiments of the vehicle are applicable to and combinable with all embodiments of the monitoring circuit, and vice versa.

Further advantages and advantageous features of the invention are disclosed in the following description and in the dependent claims.

The embodiments herein are not limited to the features and advantages mentioned above. A person skilled in the art will recognize additional features and advantages upon reading the following detailed description.

BRIEF DESCRIPTION OF THE DRAWINGS

With reference to the appended drawings, below follows a more detailed description of embodiments of the invention cited as examples.

In the drawings.

The drawings are not necessarily to scale, and the dimensions of certain features may have been exaggerated for the sake of clarity. Emphasis is instead placed upon illustrating the principle of the embodiments herein.

DETAILED DESCRIPTION OF EXAMPLE EMBODIMENTS OF THE INVENTION

Figure 2:
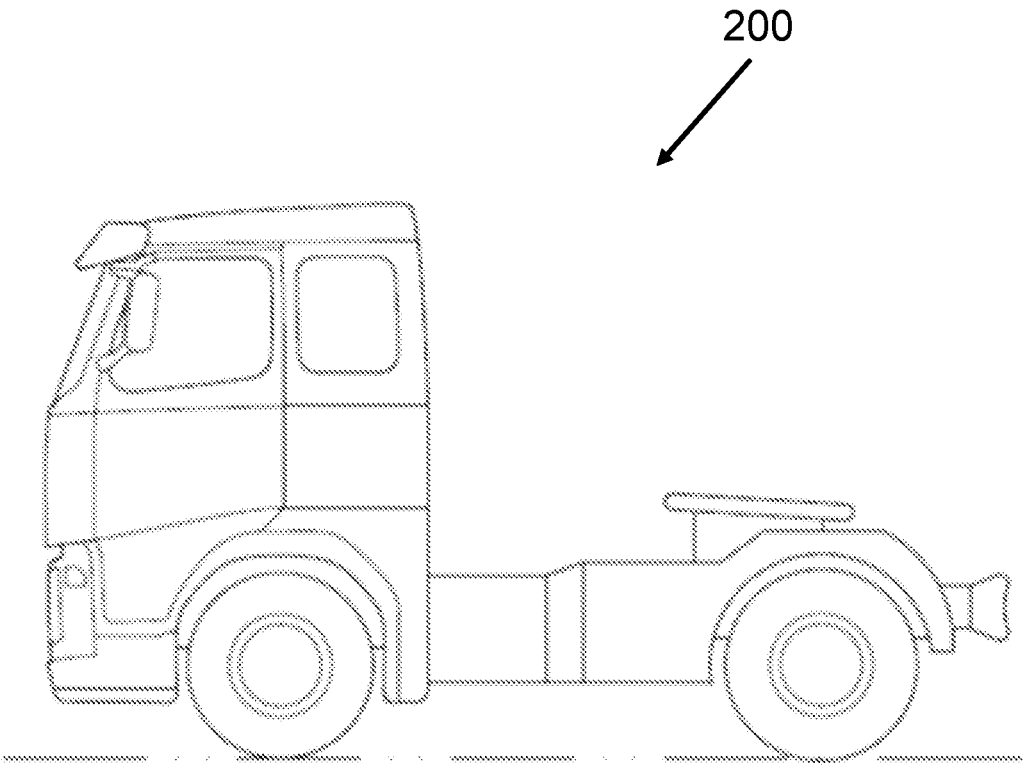
FIG. 2 is a schematic drawing illustrating an at least partly electrically powered vehicle.

FIG. 2 is a schematic drawing illustrating a vehicle 200. The vehicle 200 may be any arbitrary vehicle, for instance a car, truck, lorry, van, bus, motorcycle etc. The vehicle 200 may be at least partly autonomous or self-driven, it may be completely autonomous or self-driven, or it may be non-autonomous etc. The vehicle 200 is an at least partly electrically powered vehicle, i.e. it may be a fully electrically operated vehicle or a hybrid vehicle, comprising also a combustion engine.

Figure 3:
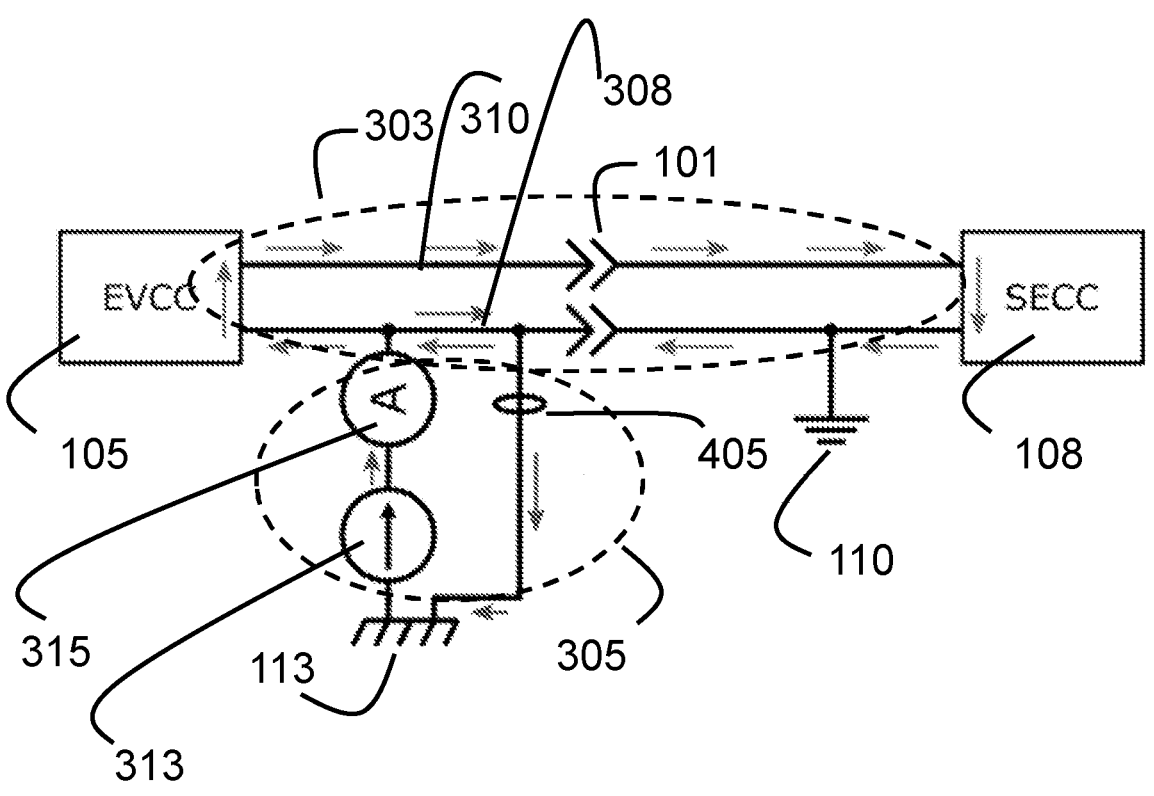
FIG. 3 is a schematic drawing illustrating a vehicle charging interface.

FIG. 3 schematic drawing illustrating a vehicle charging interface 300. As seen in FIG. 3, the vehicle charging interface 300 comprises a charging inlet 101, an EVCC 105 and a SECC 108. The charging inlet 101 and the EVCC 105 are comprised in the vehicle 200. The SECC and the PE ground 110 are comprised in the charging station. The charging inlet 101 may be described as adapted to receive a charging cable (not illustrated in FIG. 3) for charging the vehicle 200. In other words, charging cable may comprise a plug adapted to be connected to a socket comprised in the charging inlet 101 of the vehicle 200.

The vehicle charging interface 300 comprises a communication circuit 303 and a monitoring circuit 305, both illustrated with dotted circles in FIG. 3.

The communication circuit 303 is adapted to enable communication between the EVCC 105 and the SECC 108. When the charging cable is connected to the charging inlet 101, communication signals travel through the communication circuit 303 between the EVCC 105 and the SECC 108, One purpose of the communication signals may be to control the charging sequence, e.g. the current that the vehicle requests. The communication circuit 303, also referred to as a control pilot circuit, may be, as seen from the vehicle perspective, located between the charging inlet 101 and the EVCC 105, The communication circuit 303 may be located between the EVCC 105 and the SECC 108. When the charging inlet 101 is located between the EVCC 105 and the SECC 108, the communication circuit may be described as being located between the EVCC 105, via the charging inlet 101, to the SECC 108. The communication circuit 303 may comprise communication lines, e.g. a first line 308 and a second line 310. The first line 308 may be adapted to enable communication from the EVCC 105 to the SECC 108, illustrated with the arrows pointing to the right in FIG. 3, or to enable communication from the SECC 108 to the EVCC 105. The second line 310 may be adapted to enable communication from the SECC 108 to the EVCC 105, illustrated with the arrows pointing to the left in FIG. 3, or to enable communication from the EVCC 105 to the SECC 108. The communication signal travels on both the first line 308 and the second line 310, and in opposite directions. The communication signal that travels through the communication circuit 303 may be referred to as a communication pilot or communication pilot signal. The first line 308 and the second line 310 may be separate and standalone communication lines, or they may be integrated into one communication line which is adapted to provide two-way communication. The charging inlet 101 may be located at any suitable point on the first line 308 and the second line 310, for example in the middle between the EVCC 105 and the SECC 108, closer to the EVCC 105 than to the SECC 108, or closer to the SECC 108 than to the EVCC 105. The total length of the cable between the SECC 108 and the EVCC 105 may be any suitable length, for example maximum 10 meters. The distance between the EVCC and the charging inlet 101 may be maximum 2 meters and the distance between the SECC 108 and the charging inlet 101 may be maximum 8 meters, i.e. maximum 10 meters in total. Note that this is only an example and that any other suitable length may be applicable. It may be preferred that the distance between the EVCC 105 and the charging inlet 101 is as short as possible.

The PE ground 110 may be connected to the first line 308 and between the charging inlet 101 and the SECC 108.

Figure 1:
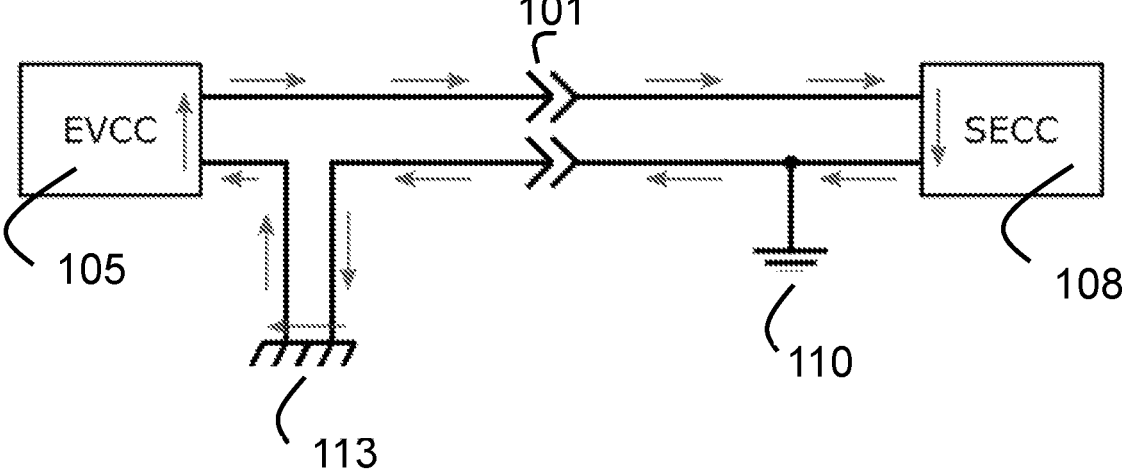
FIG. 1 is a schematic drawing illustrating a vehicle charging interface.

The monitoring circuit 305 is illustrated in FIG. 3 and in more detail in FIG. 4, and both these FIGS. will be used in the following when describing the monitoring circuit 305. As seen in FIG. 3, the monitoring circuit 305 is separated from the communication circuit 310. The PE monitoring function is removed from the communication circuit 303 (compared with FIG. 1) and replaced by a separate monitoring circuit 305, e.g. a small DC loop through the PE connection 113. The communication signals will only travel through the communication circuit 303, and not through the monitoring circuit 305. It is only the monitoring signal that will travel through the monitoring circuit 305, and not the communication signal. With the separation of the circuits, the communication between the EVCC 105 and the SECC

108 will continue, and charging will still be possible even if the PE connection 113 is malfunctioning or is experiencing problems.

Figure 4:
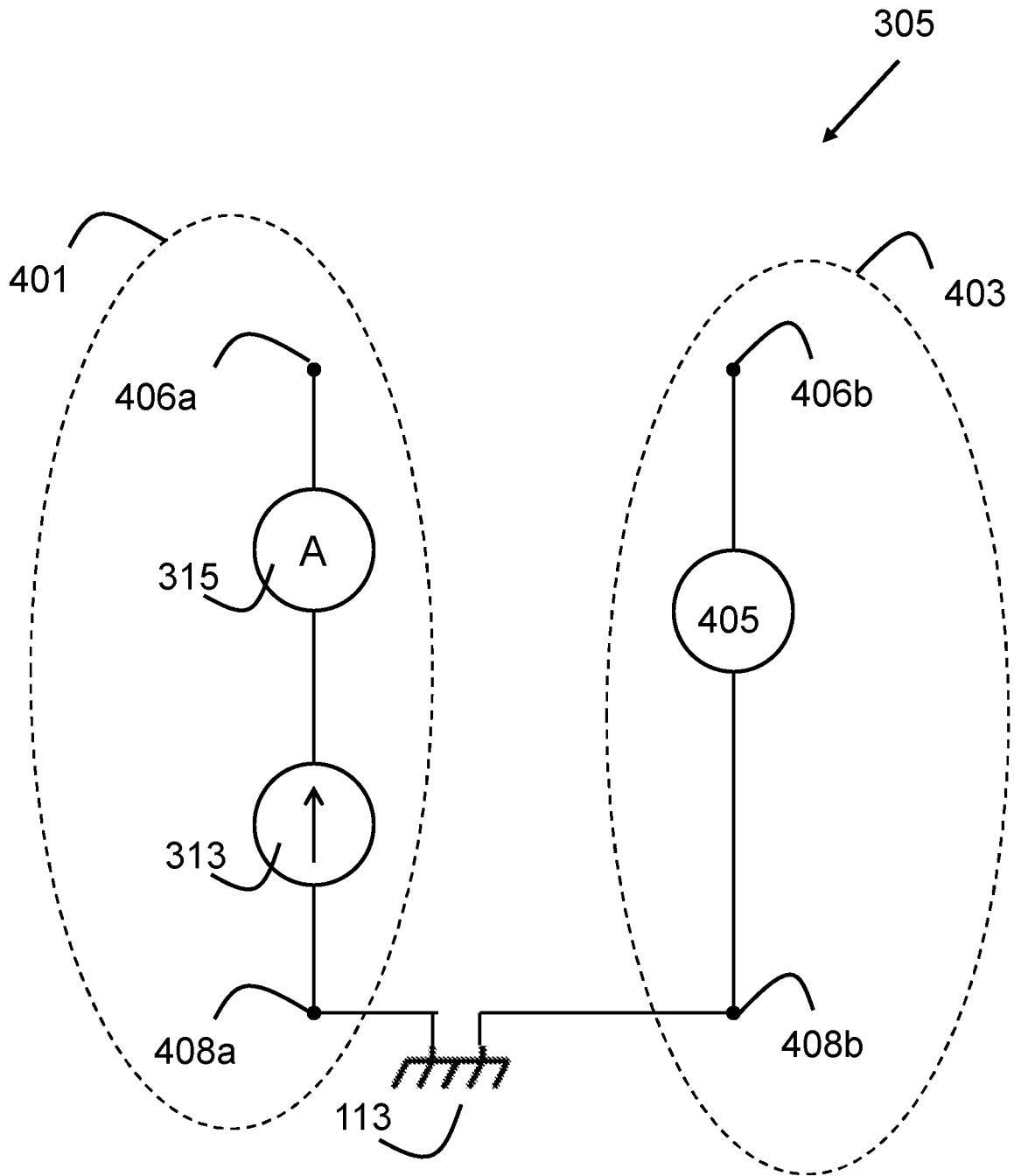
FIG. 4 is a schematic drawing illustrating a monitoring circuit.

As seen in FIGS. 3 and 4, the monitoring circuit 305 comprises a current source 313, a current measuring unit 315 and the PE connection 113. The current source 313 is adapted to generate a current running through the monitoring circuit 305. The current source 313 may generate current and the current measuring unit 315 may measure the current when the vehicle 200 is connected to the charger, i.e. the monitoring may be active as long as the vehicle 200 is connected to the charger. The current measuring unit 315 is adapted to measure the current running through the monitoring circuit 305 and thereby monitoring the PE connection 113. The current generated by the current source 31 may be of any suitable size sufficient to check the continuity of the PE connection 113. A purpose of monitoring the PE connection 113 is to ensure that the connection between the charging station PE and the vehicle chassis is intact. A result of the monitoring will indicate that the PE connection 113 is correctly functioning or that the PE connection 113 is not functioning correctly, e.g. that it is malfunctioning, that it is an error associated with the PE connection 113, that there is a discontinuity associated with the PE connection 113. When the result of the monitoring of the PE connection 113 indicates that the PE connection 113 is function correctly, then this may be indicated by that the current measuring unit 315 measures a current that is substantially the same as the current generated by the current source 313. When the result of the monitoring of the PE connection 113 indicates that the PE connection 113 is not function correctly, then this may be indicated by that the current measuring unit 315 measures a current that is different from the current generated by the current source 313, possibly with some tolerance.

The current source 313 may be connected in series with the current measuring unit 315, and possibly comprised in a first branch 401 of the monitoring circuit 305.

The monitoring circuit 305 may comprise a second branch 403, and the second branch 403 may be connected in parallel with the first branch 401. The second branch 403 may comprise a choke 405. The choke 405 may be for example a ferrite or any other suitable choke type. The purpose of the choke 405 may be to make it difficult for the communication signal to travel in the monitoring circuit 305, further isolating the communication signal from the monitoring circuit 305. The changes in the monitoring circuit 305 does not affect the characteristics of the communication circuit 303, which avoids or reduces the need for calibration of the EVCC 105.

The first branch 401 and the second branch 403 may each have a first end 406*a*, 406*b* and a second end 408*a*, 408*b*. Both the first branch 401 and the second branch 403 may be connected to the communication circuit 303 at the first ends 406*a*, 406*b* and to the PE connection 113 at the second ends 408*a*, 408*b*.

The present invention may be summarized as follows:

A monitoring circuit 305 for monitoring of a PE 113 connection in a vehicle charging interface 300 of a vehicle 200. The vehicle 200 is at least partly electrically powered. The monitoring circuit 305 is connected to a first line 308 of a communication circuit 303. The monitoring circuit 305 and the communication circuit 303 are separate circuits. The monitoring circuit 305 comprises a current source 313, a current measuring unit 315 and the PE connection 113. The current source 313 is adapted to generate a current running through the monitoring circuit 305, and the current measuring unit 315 is adapted to measure the current running through the monitoring circuit 305 and thereby monitoring the PE connection 113.

The monitoring circuit 305 may comprise a first branch 401, and the first branch 401 may comprise the current source 313 connected in series with the current measuring unit 315.

The monitoring circuit 305 may comprises a second branch 403 connected in parallel with the first branch 401, and the second branch 403 may comprises a choke 405.

The first branch 401 and the second branch 403 may each have a first end 406*a*, 406*b* and a second end 408*a*, 408*b*. Both the first branch 401 and the second branch 403 may be connected to the communication circuit 303 at the first ends 406*a*, 406*b* and to the PE connection 113 at the second ends 408*a*, 408*b*.

A vehicle charging interface 300 comprises a charging inlet 101 adapted to receive a charging cable. The vehicle charging interface 300 comprises a communication circuit 303 located between the charging inlet 101 and an EVCC 105. The communication circuit 303 is adapted for communication between the EVCC 105 and a SECC 108. The vehicle charging interface 300 comprises the monitoring circuit 305 as described herein.

The communication circuit 303 may be independent of the PE connection 113.

The charging inlet 101 may comprises the EVCC 105, or the charging inlet 101 and the EVCC 105 may be separate units.

An at least partly electrically powered vehicle 200 comprises the monitoring circuit 305 described herein. An at least partly electrically powered vehicle 200 comprises the vehicle charging interface 300 described herein.

According to the present invention, the monitoring of the PE connection 113 is separated from the communication circuit 303. If this is combined with a standardized vehicle side harness, e.g. by integrating the EVCC 105 in the charging inlet 101, the signal characteristics will be well defined, and changes in the PE cable routing does not affect the communication. Otherwise, changes to the PE cables might require recalibration of the EVCC 105 to ensure proper communication.

The PE integrity monitoring of the PE to chassis ground connection is made with a separate circuit, i.e. the monitoring circuit 305. The communication signal path and thus the PSD does not depend on the PE connection 113. To make the communication signal path as short and well-defined as possible, the EVCC 105 may be integrated into the charging inlet 101.

The separate monitoring circuit 305 together with a specified communication circuit 310 harness between the EVCC 105 and the inlet 101, the same PSD calibration can be used for all vehicles 200.

Multiple solutions exist to keep the harness of the communication circuit 303 well defined, and one way may be to integrate the EVCC 105 into the charging inlet 101 itself, thus eliminating any external cables.

As mentioned earlier, the CCS standard states that integrity of the PE connection 113 should be monitored and that the PSD from the EVCC 105 in the communication circuit 301, at the charging inlet 101, must be kept within specified limits. The integrity of the PE connection 113 indicates that the PE wire from the charger is properly connected to the vehicle chassis. With the separation of the monitoring circuit 305 and the communication circuit 310, the PSD level may be kept uniform, i.e. within the standardized limits, at the charging inlet 101 and even with variations in the routing and/or cable lengths of the PE wiring between the charging inlet 101 and the vehicle chassis.

With the present invention, the PSD level or PSD characteristics at the charging inlet 101 is kept uniform for all installations. This is made possible with two parts: 1) keeping the communication circuit 303 the same for all vehicle installations, and 2) removing any dependencies on the selection of the PE connection 113, i.e. the chassi ground point.

Part one 1) is achieved by using a wiring of the communicatoin circuit 303 that is the same for all vehicle installations, or by removing the wires and integrating the EVCC 105 in the charging inlet 101.

To resolve the part 2) a separate monitoring circuit 305 is used to monitor the PE connection 305, i.e, the ground connection. To further minimize any impact on the PSD from the grounding structure, an optional choke 405 may be used to further prevent any communication signal from traveling in the ground wire or chassis structure.

It is to be understood that the present invention is not limited to the embodiments described above and illustrated in the drawings; rather, the skilled person will recognize that many changes and modifications may be made within the scope of the appended claims.

Directions as used herein, e.g. horizontal, vertical, lateral, relate to when the monitoring circuit 305 and/or the vehicle charging interface 300 is mounted in the vehicle 200, with the vehicle 200 standing on flat ground. The monitoring circuit 305 and the vehicle charging interface 300 may be manufactured, stored, transported and sold as a separate unit. In that case, the directions may differ from when mounted in the vehicle 200.

The embodiments herein are not limited to the above-described embodiments. Various alternatives, modifications and equivalents may be used. Therefore, the above embodiments should not be taken as limiting the scope of the embodiments, which is defined by the appended claims. A feature from one embodiment may be combined with one or more features of any other embodiment.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A monitoring circuit for monitoring of a Protective Earth, PE, connection in a vehicle charging interface of a vehicle, wherein the vehicle is at least partly electrically powered, wherein the monitoring circuit is connected to a first line of a communication circuit, wherein the monitoring circuit and the communication circuit are separate circuits, wherein the monitoring circuit comprises a current source, a current measuring unit and the PE connection, wherein the current source is adapted to generate a current running through the monitoring circuit, wherein the current measuring unit is adapted to measure the current running through the monitoring circuit and thereby monitoring the PE connection, wherein the monitored PE connection is a PE connection to the chassis of the vehicle.

2. The monitoring circuit according to claim 1, wherein the monitoring circuit comprises a first branch, and wherein the first branch comprises the current source connected in series with the current measuring unit.

3. The monitoring circuit according to claim 1, wherein the monitoring circuit comprises a second branch connected in parallel with the first branch, and wherein the second branch comprises a choke.

4. The monitoring circuit according to claim 3, wherein the first branch and the second branch each have a first end and a second end, wherein both the first branch and the second branch are connected to the communication circuit at the first ends and to the PE connection at the second ends.

5. A vehicle charging interface comprising:

a charging inlet adapted to receive a charging cable;

a communication circuit located between the charging inlet and an Electric Vehicle Communication Controller, EVCC, wherein the communication circuit is adapted for communication between the EVCC and a Supply Equipment Communication Controller, SECC; and a monitoring circuit for monitoring of a Protective Earth, PE, connection in a vehicle charging interface of a vehicle, wherein the vehicle is at least partly electrically powered, wherein the monitoring circuit is connected to a first line of a communication circuit, wherein the monitoring circuit and the communication circuit are separate circuits, wherein the monitoring circuit comprises a current source, a current measuring unit and the PE connection, wherein the current source is adapted to generate a current running through the monitoring circuit, wherein the current measuring unit is adapted to measure the current running through the monitoring circuit and thereby monitoring the PE connection, wherein the monitored PE connection is a PE connection to the chassis of the vehicle.

6. The vehicle charging interface according to claim 5, wherein the communication circuit is independent of the PE connection.

7. The vehicle charging interface according to claim 5, wherein the charging inlet comprises the EVCC, or wherein the charging inlet and the EVCC are separate units.

8. An at least partly electrically powered vehicle comprising a monitoring circuit for monitoring of a Protective Earth, PE, connection in a vehicle charging interface of a vehicle, wherein the vehicle is at least partly electrically powered, wherein the monitoring circuit is connected to a first line of a communication circuit, wherein the monitoring circuit and the communication circuit are separate circuits, wherein the monitoring circuit comprises a current source, a current measuring unit and the PE connection, wherein the current source is adapted to generate a current running through the monitoring circuit, wherein the current measuring unit is adapted to measure the current running through the monitoring circuit and thereby monitoring the PE connection, wherein the monitored PE connection is a PE connection to the chassis of the vehicle.

* * * * *